(No Model.)

R. P. MORAN.
HORSE DETACHER.

No. 445,025. Patented Jan. 20, 1891.

Witnesses:
E. P. Ellis,
B. Brockett.

Inventor
R. P. Moran,
per Lehmann & Pattison,
Attys

UNITED STATES PATENT OFFICE.

ROBERT PRICE MORAN, OF GLASGOW, KENTUCKY.

HORSE-DETACHER.

SPECIFICATION forming part of Letters Patent No. 445,025, dated January 20, 1891.

Application filed October 17, 1890. Serial No. 368,402. (No model.)

*To all whom it may concern:*

Be it known that I, ROBERT PRICE MORAN, of Glasgow, in the county of Barren and State of Kentucky, have invented certain new and useful Improvements in Horse-Detachers; and I do hereby declare the following to be a full, clear, and exact description of the invention, such as will enable others skilled in the art to which it pertains to make and use it, reference being had to the accompanying drawings, which form part of this specification.

My invention relates to an improvement in horse-detachers; and it consists in the combination and arrangement of parts which will be fully described hereinafter.

The object of my invention is to provide a means by which the usual traces are entirely done away with and the harness is fastened to the shafts direct, thus enabling the driver to detach the horse at any moment in case of a runaway or other accident.

Figure 1:
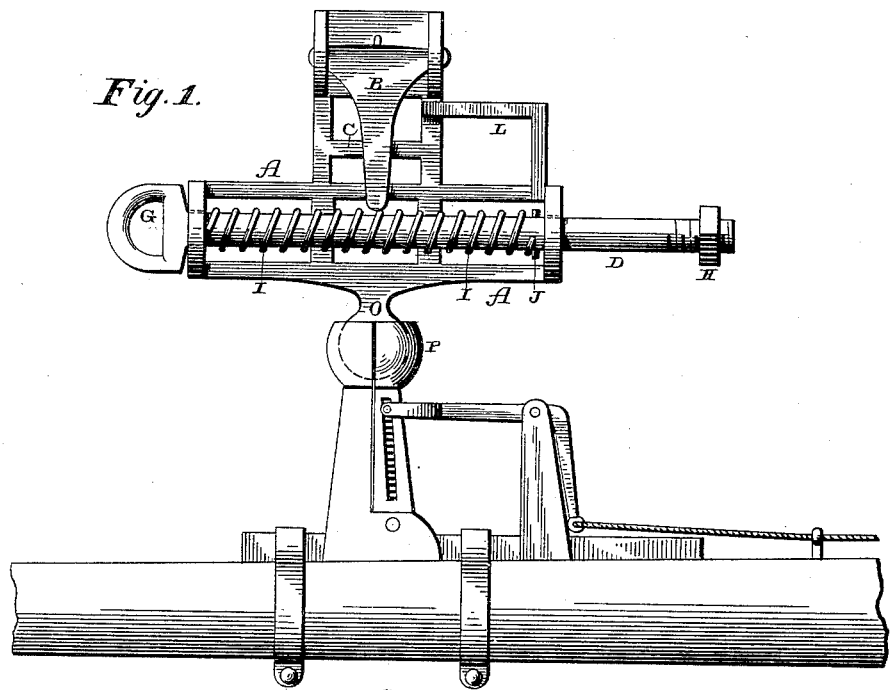
Figure 2:
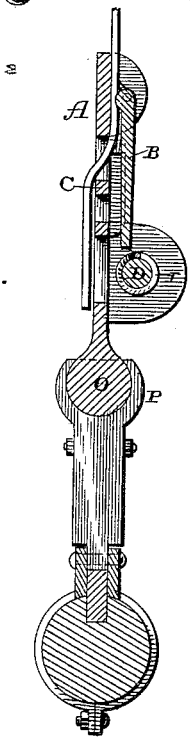

Figure 1 is a side elevation of a device which embodies my invention. Fig. 2 is a vertical cross-section of the same.

A represents a suitable metallic frame of any suitable shape, size, or construction that may be preferred and which is provided with a buckle or a clamping-lever B for attaching the frame to the saddle-strap. Extending across the upper portion of this frame is a cross-bar C, which serves to hold the girt.

The lower portion of the frame A is made of any suitable length, and extending horizontally through it is the draft-rod D, which is provided with a loop G at its front end, so as to be fastened to the hame or breast strap, and which has a nut or other suitable stop H placed upon its rear end to prevent the rod from being drawn through the frame. When the nut H strikes against the rear end of the frame A, the full draft of the animal is transferred from the rod D to the frame A. Placed around this rod D is a spiral spring I, which has its front end to bear against the front end of the frame A and its rear end to bear against the stop J, secured rigidly to the rod. This spring allows the rod an endwise movement, so as to conform to the movement of the horse when it is moving forward. If it were not for this spring the vehicle would partake of the horse motion to such an extent as to make it very uncomfortable for the rider. Formed upon the upper rear corner of the frame A is a loop L, in which the holdback-strap is fastened.

The rods D take the place of the ordinary traces, and the holdback-straps being fastened to the frame A it will be seen that no part of the harness is fastened directly to the vehicle, so that in case of a runaway or other accident the horse can be instantly freed from the vehicle.

Projecting from the lower edge of the frame A is a ball or projection O, of any suitable shape, size, or construction that may be preferred, but which is preferably given a globular form. This projection O fits inside of a clamp P, of any suitable construction, attached to the upper side of the shaft. Fastened to this clamp in any suitable manner is a wire or cord which extends back to the driver in the vehicle and by means of which he can instantly open the clamp so as to allow the ball to slide freely out. These two balls—one upon each side of the horse—are the only means of connection between the animal and the shafts, and hence when the clamps are opened the balls are instantly freed, the shafts fall to the ground, and the horse goes on, merely taking the driving-reins with him. All of the draft upon the rods D is transferred through the frame A directly to the clamps upon the shafts, and these balls and the clamps are the only points at which the animal is attached to the vehicle.

Having thus described my invention, I claim—

1. In a horse-detacher, the combination of a draft-frame having a means of attachment to the harness, a spring-actuated draft-bar, a projection upon its lower edge, a clamp consisting of a stationary part secured to the shaft, a second part pivoted at its lower end to the lower end of the stationary part, the two parts having a socket in their upper ends to receive the projection, a spring for closing the pivoted part, and a means connected therewith for closing it, substantially as shown and described.

2. In a horse-detacher, the combination of a draft-frame having a means of attachment to the harness and a projection, a two-part clamp secured to the shaft in which the projection is placed, one of the parts being movable and provided with a longitudinal slot, and a lever pivoted upon the shaft which engages the said slot, and an operating cord or rod attached to the lever, substantially as shown and described.

In testimony whereof I affix my signature in presence of two witnesses.

ROBERT PRICE MORAN.

Witnesses:
H. C. SMITH,
H. C. TRIGG.